United States Patent
Pudelko et al.

(10) Patent No.: US 7,551,064 B2
(45) Date of Patent: Jun. 23, 2009

(54) METHOD AND DEVICE FOR SECURING A VEHICLE AGAINST THEFT

(75) Inventors: Herbert Pudelko, Usingen (DE); Peter Köhler, Weilburg (DE)

(73) Assignee: Idas Informations-Daten- und Automationssysteme GmbH, Limburg/Lahn (DE)

( * ) Notice: Subject to any disclaimer, the term of this patent is extended or adjusted under 35 U.S.C. 154(b) by 400 days.

(21) Appl. No.: 10/567,671

(22) PCT Filed: Aug. 10, 2004

(86) PCT No.: PCT/EP2004/008946

§ 371 (c)(1),
(2), (4) Date: Jun. 2, 2006

(87) PCT Pub. No.: WO2005/019005

PCT Pub. Date: Mar. 3, 2005

(65) Prior Publication Data

US 2006/0273879 A1    Dec. 7, 2006

(30) Foreign Application Priority Data

Aug. 13, 2003  (DE) ............................. 103 37 424
Sep. 26, 2003  (DE) ............................. 103 45 129
Nov. 20, 2003  (DE) ............................. 103 54 398
Jun. 15, 2004  (DE) ......................... 10 2004 028 569

(51) Int. Cl.
 B60R 25/10  (2006.01)

(52) U.S. Cl. .............................. 340/426.1; 340/426.36; 340/5.72; 307/10.5

(58) Field of Classification Search ............. 340/426.1, 340/426.11, 426.13, 426.17, 426.35, 426.36
See application file for complete search history.

(56) References Cited

U.S. PATENT DOCUMENTS

| | | | | |
|---|---|---|---|---|
| 5,049,867 A | * | 9/1991 | Stouffer | 340/426.17 |
| 5,335,748 A | * | 8/1994 | Wilson | 340/426.11 |
| 5,349,329 A | | 9/1994 | Smith | |
| 5,412,370 A | * | 5/1995 | Berman et al. | 340/426.36 |
| 5,463,372 A | * | 10/1995 | Mawyer, Sr. | 340/428 |
| 5,473,318 A | * | 12/1995 | Martel | 340/5.23 |
| 5,486,806 A | * | 1/1996 | Firari et al. | 340/426.11 |
| 5,494,130 A | * | 2/1996 | Foster | 180/287 |
| 5,519,255 A | * | 5/1996 | Burtch et al. | 340/426.11 |

(Continued)

FOREIGN PATENT DOCUMENTS

DE       19529666       12/1996

(Continued)

*Primary Examiner*—Eric M Blount
(74) *Attorney, Agent, or Firm*—Notaro & Michalos P.C.

(57) ABSTRACT

The invention relates to a method and a device for securing a vehicle against theft. According to the invention, at least one essential operating element (2) of the vehicle can be switched between three operating states A, B and C. An external authorization device (3) switches the operating element into the unlimited operating state A. If a defined action (20) is carried out, for example the driver's door is opened, the operating element is switched into the operating state B for a defined period of time. If authorization information is transmitted during this time, the operating element is switched back to the operating state A. Otherwise, once this period of time has expired, the operating element is switched into the non-operational operating state C.

16 Claims, 4 Drawing Sheets

U.S. PATENT DOCUMENTS

| | | | | |
|---|---|---|---|---|
| 5,608,272 | A * | 3/1997 | Tanguay | 307/10.2 |
| 5,635,901 | A * | 6/1997 | Weinblatt | 340/426.12 |
| 5,664,113 | A * | 9/1997 | Worger et al. | 705/28 |
| 5,708,712 | A * | 1/1998 | Brinkmeyer et al. | 340/5.25 |
| 5,739,749 | A * | 4/1998 | Hwang | 340/426.11 |
| 6,018,291 | A * | 1/2000 | Marble et al. | 340/426.12 |
| 6,195,648 | B1 * | 2/2001 | Simon et al. | 340/5.31 |
| 6,323,762 | B1 * | 11/2001 | Ekpo, Jr. | 340/426.35 |
| 6,400,042 | B1 * | 6/2002 | Winner et al. | 340/426.17 |
| 6,429,773 | B1 * | 8/2002 | Schuyler | 340/425.5 |
| 6,538,557 | B1 * | 3/2003 | Giessl | 340/5.2 |
| 6,611,201 | B1 * | 8/2003 | Bishop et al. | 340/426.21 |
| 6,636,145 | B1 * | 10/2003 | Murakami et al. | 340/5.9 |
| 6,833,785 | B2 * | 12/2004 | Brown et al. | 340/426.12 |
| 7,342,324 | B2 * | 3/2008 | Bottomley | 307/10.3 |

FOREIGN PATENT DOCUMENTS

| | | |
|---|---|---|
| DE | 19643759 | 10/1998 |
| DE | 10057423 | 7/2001 |
| EP | 0637528 | 2/1994 |
| EP | 0610902 | 8/1994 |
| EP | 0788946 | 8/1996 |
| EP | 1186491 | 9/2001 |
| EP | 1002705 | 4/2004 |
| WO | WO 96/16845 | 6/1996 |
| WO | WO 00/48873 | 8/2000 |
| WO | WO 00/73106 | 12/2000 |

* cited by examiner

METHOD AND DEVICE FOR SECURING A VEHICLE AGAINST THEFT

FIELD AND BACKGROUND OF THE INVENTION

The invention relates to a method for securing a motor vehicle against theft. The invention furthermore relates to a system for securing a motor vehicle against theft through means for switching over at least one essential operational element of the motor vehicle, the means for switching comprising at least one usage authorization device, at least one switching device switching between specific operational states of the essential operational element(s) and means for transmitting the authorization data between the usage authorization device and the switching device.

In the majority of current automobiles immobilizers are already installed, such as have been described for example in GB 2279479 A, DE 9414476 and DE 19604206. However, this type of immobilizer can already be circumvented for example thereby that the unauthorized person receives the coded signal of a transponder which discloses the identity of the authorized person, and can subsequently identify himself accordingly. Such an immobilizer of the vehicle is therefore readily circumvented.

A further security problem is the so-called "car napping", in which the authorized person together with the motor vehicle is forced to make it possible for the unauthorized person to use the vehicle.

DE 4440975 has already dealt with this problem. This document proposes a protection device against third party use for motor vehicles with a usage control device, in which a transmitting device external to the vehicle continuously transmits periodically successive vehicle-specific usage signals to the usage control device in order to permit the use of the vehicle.

However, this type of securement has significant disadvantages. For example the involvement of an additional certification site, such as for example the police or the motor vehicle manufacturer, is necessary in order to make possible the secure operation of the system. This also causes additional expenses.

The system is furthermore limited with respect to the particular usage times and the particular usage area and these cannot be set arbitrarily and are therefore inflexible.

Furthermore, it is possible in the case of this third party usage protection device to obtain from the authorized person the usage control device, for example a mobile telephone, by force through car napping and thereby to circumvent the system at least for a time.

Summary of the Invention

The aim of the invention is therefore to provide a flexible method, which can be adapted to the security requirements of the motor vehicle entitlement holder, and a system for carrying out this method, which nevertheless have an extremely high effectiveness against theft.

This task is solved according to the invention through a method in which at least one essential operational element of the vehicle can be switched over between three operating states A, B and C and the switching between these operating states takes place according to the following steps:

a. The essential operational elements are switched into a substantially operation-ready operating state A, through an external usage authorization device independent of the motor vehicle, through means for the transmission of the usage authorization data;

b. At least one essential operational element is switched, by an event-dependent circuit through at least one event, into an operation-ready operational state B for a length of time, the time depending on predefined operating parameters;

c. Either at least one essential operational element of the vehicle is switched into a non-operation-ready state or a restricted operation-ready operating state C after the passage of the length of time for putting the vehicle out-of-operation or the essential operational elements are switched according to method step a) into the operation-ready operating state A before passage of the length of time by means for the transmission of the usage authorization data.

This task is furthermore also solved through the system according to the invention, which provides that the essential operational element(s) can be switched between three operating states A, B and C, the operating state A permitting a substantially unrestricted operation of the essential operational element(s), operating state B permitting operation of the essential operational element(s) restricted in time to a length determined through operating parameters, and operating state C permitting the blocking of the essential operational elements, the switching device being connected via at least one operational connection with at least one means for detecting a switching event.

By installing such a system which functions according to the above described method, the theft of a car, secured through the present method or the system, becomes unprofitable and therewith uninteresting. The vehicle can be operated by the vehicle holder under normal conditions if the essential operational elements of the vehicle, connected to the above method or the above system, are in said operating state A. Depending on an event, at least one essential operational element of the vehicle is switched into operating state B. Events that should be selected are such, which occur at regular intervals during the use of a vehicle or, in particular, in the theft of a vehicle. In operating state B the vehicle is only operable for a certain length of time, since at least one essential operational element is put out-of-operation after the passage of this length of time and therewith the vehicle can no longer be operated.

It is also provided within the scope of the invention that, alternatively to the complete putting out of operation, switching-off the essential operational element makes only possible a restricted operation, i.e. emergency operation should be possible to a certain extent. For example, driver assistance systems can be switched off or the emergency blinking assembly be switched on. Depending on the combination, brake booster, distance control, cruise control, etc., can permit restricted emergency operation, for example, if, after disconnecting the power supply, a transfer trip from a foreign country into the home country would first be necessary in order to reset the system.

In order to switch the vehicle during the time in which the essential operational element is in operating state B back into the unrestricted operation-ready operating state, it is necessary that the vehicle holder is verified as the authorized person at an external usage authorization device, independent from the vehicle, and that these authorization data are transmitted to the vehicle. The vehicle is thereupon switched again into operating state A.

One implementation advantageously provides that as a means for transmitting the authorization data from the usage authorization device a vehicle key is utilized, through which the authorization data, preferably encrypted, is transmitted to a switching device, which, in the event of authorization, switches the essential operational element of the vehicle into operating state A and that subsequently the authorization data in the vehicle key is deleted. Since the usage authorization device is located outside of the vehicle, a thief, not in possession of this usage authorization device, can no longer set the vehicle into operation after the passage of said length of time. Thereby that the authorization data is deleted from the vehicle key, switching into operating state A with the vehicle key can only take place once in each instance.

Due to the measure that in the case of erroneous authorization data at least one essential operational element is switched into operating state C, the vehicle immediately becomes incapable of being driven, whereby restoration of the capability of being driven must take place, for example through a certification site or the motor vehicle manufacturer.

Furthermore is provided in an advantageous embodiment of the invention that the essential operational element(s) after passage of the length of time are automatically switched into the operating state C. Due to this measure, circumvention of the system or of the method for securing the vehicle against theft is prevented even if the thief were to replace the essential operational element(s). Since, for example, a control apparatus is a possible essential operational element, this replacement is cumbersome and expensive. Theft becomes thereby unprofitable.

The security of the method is furthermore increased through the measure that the length of time is restricted to a maximum by having a counter include a maximal number of digits for the length of time. Thereby, even if a thief were to interfere with the essential operational element, the length of time cannot be set to an arbitrarily high value and would therefore have to be newly manipulated each time. The sale to a third party becomes thereby economically unjustifiable.

In a further embodiment of the invention the method has been improved thereby that the vehicle as well as also the usage authorization device are individualized once through an authorization code before the first initial operation. Through this measure, even a replacement of several essential operational elements of the vehicle does not overcome the security device and the security method, since the authorization data are only possible from the vehicle, sold together with the usage authorization device and individualized. This can take place, for example through the input of a PIN code, which is only known to the vehicle holder, and a corresponding encryption algorithm.

A further embodiment of the invention provides that the operating parameters can be set on the usage authorization device. The length of time, for which the vehicle can still be operated in operating state B, depends substantially on these parameters. The user himself can decide in this manner the time he wishes to have available when of switching from operating state A to operating state B, in order to be able to carry out the resetting into the operating state A. In this way the reasonable default settings by the factory can be adapted to the habits or requirements of each individual vehicle holder. It is also conceivable that profiles for different users are stored for different users in the usage authorization device, which, again, are backed by different operating parameters. Such operating parameters can be for example a time period, a distance in kilometers, number of starting events, frequency of opening the door or frequency of switching on the radio. Further measurable and always recurring operating parameters are also conceivable. To ensure that the usage authorization device is only utilized by authorized persons, a further implementation of the invention provides that the usage authorization device comprises means of querying the authorization. In this way it is ensured on the usage authorization device that the operating parameters can only be changed by an authorized person and the authorization data can be transmitted to the vehicle. Such means for querying authorization can be for example a biometric authorization query, an authorization query by means of chip card or by means of the replacement key and/or workshop key provided on the usage authorization device. It is understood that further authorization queries, known to the person of skill in the art, are conceivable, such as for example entering a numerical combination.

A further improved embodiment of the invention provides that the events, triggering the switching of the operating state of the essential operational element of the vehicle, are selected by the usage authorization device. This leads to further individualizing and difficulties for a thief to circumvent a security device. The vehicle holder can determine which events would lead to the switching of operating state A into operating state B. In turn, thereon can depend which essential operational element is put out of operation, if the specific events are linked to a specific essential operational element and only set this particular element into operating state B. Depending on the type of event, which triggers the switching, a longer or shorter time period for reactivation can thereby also be predetermined.

The inventive device is improved thereby that the means for detecting a switching event is an actuation switch located in the vehicle. The actuation switch can be integrated for example in the dashboard of the vehicle or in the driver door. This switch can still be triggered directly even spontaneously in the event of a theft in the form of the car napping, which is increasingly becoming more fashionable. The thief can initially move the car and release the vehicle holder. Since the immobilization of the vehicle during driving entails the endangerment of other road users, the blocking of the vehicle occurs at the next opportunity, for example when the vehicle is started next.

A further implementation of the invention provides that the means for detecting a switching event comprises a sensor for the actuation of an opening of the vehicle and a locking sensor for detecting the locking state of the vehicle. The opening can involve for example the car door, engine compartment hood, gasoline cap or trunk of the vehicle. However, switching the operating state takes place only in the case when the vehicle is locked and the vehicle is nevertheless opened. In this case it is also advisable to set the time period of the switching such that it is relatively short.

Further means for detecting a switching event provided in an advantageous implementation of the invention are a passenger compartment monitoring sensor, a sensor for detecting the hoisting of the vehicle, or a circuit for detecting the return of the voltage from an energy source of the vehicle. Furthermore provided is a sensor for detecting the connection of diagnostic means to plug connectors in the vehicle provided for this purpose. Yet a further implementation of the invention provides that the means for detecting a switching event includes a sensor for detecting the covering-over or also the removal of the license plate of the vehicle. This sensor can be implemented as a capacitance measuring sensor or as a thickness measuring sensor. Removal of the license plate could be triggered through a proximity switch, which responds as soon as the license plate is being removed. As the event can furthermore serve a called word, if as the means for detecting a switching event, means for speech recognition are provided.

Said means for detecting a switching event can be employed singly as well as also in combination, in order to trigger the switching of the operating state from operating state A to operating state B. It is also possible to assign each means for detecting the switching event to one specific essential operational element or several essential operational elements of the vehicle. To make the assignment such that it cannot be reproduced by a thief, the present invention makes it possible for the vehicle holder to set on the usage authorization device the assignment of the means for detecting a switching event for switching from specific essential operational elements of the vehicle.

Since most of these means for detecting the switching event are already installed in vehicles, the particular sensors only need to be connected to the switching device, in order to transmit the occurrence of the event to the switching device.

In a further advantageous embodiment as the means for detecting a switching event are provided means for determining the position and a data base listing areas of increased theft hazard, in order to trigger switching from operating state A into operating state B when driving through such areas. In this way the driver is relieved of having to make the decision whether or not to increase the securement of the system in areas of especially high theft risk. Through this measure, the handling is moreover significantly simplified.

A further advantageous implementation of the invention provides that at least one of the essential operational elements is operationally connected with a stop valve disposed in a fluid line of an essential drive power train, with the stop valve including coding which is verifiable by the essential operational element over the operational connection. Through such an additional element, which may be located for example in the engine block or at another site only accessible with increased effort, the vehicle is even better protected against thieves, who, for example, can replace or circumvent one or several of the otherwise more or less accessible essential operational elements. However, dismounting the engine block makes such a theft economically unprofitable.

By drive power train is understood the engine and/or the transmission gearing.

An alternative comprises that the engine block itself is the essential operational element and therewith a line between the essential operational element and the engine block is also not required.

To make the activation more flexible, it is provided that the device comprises means for transmitting the authorization data from the usage authorization device to the switching device from a relatively great distance. Through this measure it also becomes subsequently possible to switch the vehicle into the operating state A again if the authorized holder is far from home and therewith far from the usage authorization device. To ensure these means against manipulation, the communication can be based on a conventional encryption.

A further development of the invention provides that the means for transmitting the authorization data comprises at least one communication device, one input device and one output device, which transmits the authorization data to the switching device via an adapter. The communication device can be an Internet connection, an e-mail connection or a telephone connection, in particular a mobile telephone connection, which establishes the connection between the adapter and the usage authorization device (3).

For example an adapter can be employed for this purpose, which accepts the vehicle key and supplies it with the matching parameters for the operating states B of the essential operational elements and, moreover, transmits the correct code optionally changed with an algorithm.

As the input device for operation a keypad can be considered. A further option comprises the biometric encryption of the access to the adapter.

The output device transmits the data by means of a connection to the switching device. The connection can take place to a general connection of the vehicle, for example USB, infrared or Bluetooth. The encrypted transmission via the vehicle key is also feasible.

The adapter furthermore facilitates that the usage authorization device can be developed as a conventional PC—equipped with a connection as described above.

In order to make possible in advantageous manner, for example for workshops or car rental and leasing agencies, an even more secure implementation of the subject matter according to the species, it is provided that the essential operational element(s) are switchable between two operating states B and C, the operating state B permitting operation, restricted to a time period Z by operating parameters P, of the essential operational element(s) and operating state C causing the blocking of the essential operational element(s), the switching device being connected via at least one operational connection with at least one means each for detecting a switching event. This implementation of the invention is especially advantageous in combination with the capability for transmission from a relatively great distance of the authorization data from the usage authorization device to the switching device. This allows a highly flexible arrangement of the renting and leasing of vehicles, which simultaneously entails good control over the vehicles and an increase in the protection against theft. Through the flexible arrangement of parameters P, which cause the switching from operating state B into operating state C, the special requirements and time periods of the rental or lease can thus be discussed.

In a further implementation the security of code key or code card can be raised further, if, additionally, optical characteristics are provided, which are specific to the individual vehicle, such as for example chassis number, optionally in encrypted form, and/or dates such as day and time of day which indicate when the vehicle was driven off the assembly line.

Into the code key or code card may also be inserted optical securement means such as metal strips, etc. Additional optical securement elements, which are only visible under UV light, and/or holograms can also be added.

Testing these securement elements takes place in all apparatus which must use the code key or the code card for certain processes. Such apparatus are for example the usage authorization device (UAD) and apparatus in workshop or factory, which require the code card or the code key to enable driving and/or for making replacement keys and/or for loading a new software version.

Only after the test of the security elements has been positive are the code key or code card accepted by the apparatus for the further processes.

Producing replacement keys or loading new software into the control apparatus is only possible if the code key or the code card, respectively, matching the vehicle is available and accepted by said apparatus.

To protect the control apparatus against unauthorized loading of new software, such are provided before the initial start with the "image" of the individual vehicle code in the code key or in the code card. This has already been described by the term "individualizing".

The factory can furthermore have available a test apparatus so that further tests for the authenticity of the code key or of the code card can be performed, in order to detect possible copies. Such further tests can be its thickness, weight and optionally also the nature of the material and further authenticity tests known to a person of skill in the art. This can be so utilized that the owner has a claim for benefits from theft insurance if he can present the original code card or the original code key.

In further implementation a number of different combinations of securement elements can also be employed, which are utilized in code keys or code cards of the same vehicle type. In this case for each individual vehicle is determined which securement element on the code key or the code card is applied in the individual vehicle and must be tested and which must not be available.

An organized theft will require even more effort since it is now necessary to determine and copy exactly the security combination for each vehicle individually.

In contrast, the effort for example for 10 or 50 different combinations of securement features is kept within limits at the factory, since with, for example, 500 000 sold vehicles for each version 10,000 or 50,000 samples of the same type can still be manufactured.

An organized gang, which steals for example 500 vehicles, would arrive only at a number of pieces of 10 or 50 for each code card variant. The costs would be correspondingly high.

This method is intended to prevent—or impose great efforts—that a thief, optionally with the aid of the legitimate owner, makes copies in order to steal the vehicle.

The above described securement features lead to the following:

To read out the code from code card or code key, the original must be destroyed. The thief then has to make two copies of code key or of the code card. One for the stolen vehicle and one for the legitimate owner, since the latter must present this code card or code key to the insurance in order to receive benefits from the theft insurance.

However, with the above securement technique a thief cannot use cost-effective blanks for the copies of code key or code card, he must, for one, imitate the securement features and, in addition, must apply individual vehicle data (see above). The costs in particular for one copy becomes therewith very high and the economic benefit intended with the theft is economically considerably or entirely destroyed.

In a further implementation the code key or the code card, respectively, can be such that it contains two codes. The first code is only usable for communication with the usage authorization device (UAD).

The second code can be used for the enable functions.

If the code card or the code key is inserted into the UAD, the device checks to verify whether the first code matches that of the UAD. If this is the case, the code key or the code card with the second code is loaded, which, as described above, is required to enable the functions. However, this second code is automatically deleted after it has been used once.

This has the advantage that the legitimate owner can also forget his code key or code card in the car without the second code (for the function enabling) in the event of a theft thereby falling into the hands of thieves. In order to obtain the second code, the thief would additionally also need to obtain the UAD located at the car owner's home.

The combination of all of these variants yields a large number of security stages.

The security can advantageously be further raised if key and original code card or code key must always be used together if access to the software is to be possible.

Access to the diagnostic functions, reactivation of the software after disconnecting the battery, i.e. whenever the vehicle has been currentless, the software must be activated again with the aid of key and code card (or code key).

Testing the code card can take place for example through the diagnostic apparatus in the workshop and/or through an access authorization device (AAD) in the vehicle.

BRIEF DESCRIPTION OF THE DRAWINGS

In the following the invention will be described in a preferred embodiment with reference to a drawing, with further advantageous details found in the figures of the drawing.

Functionally identical parts are provided with the same reference numbers.

The figures of the drawing depict in detail.

DESCRIPTION OF THE PREFERRED EMBODIMENT

In the following the embodiment of the invention depicted in the figures will be described.

Figure 2:
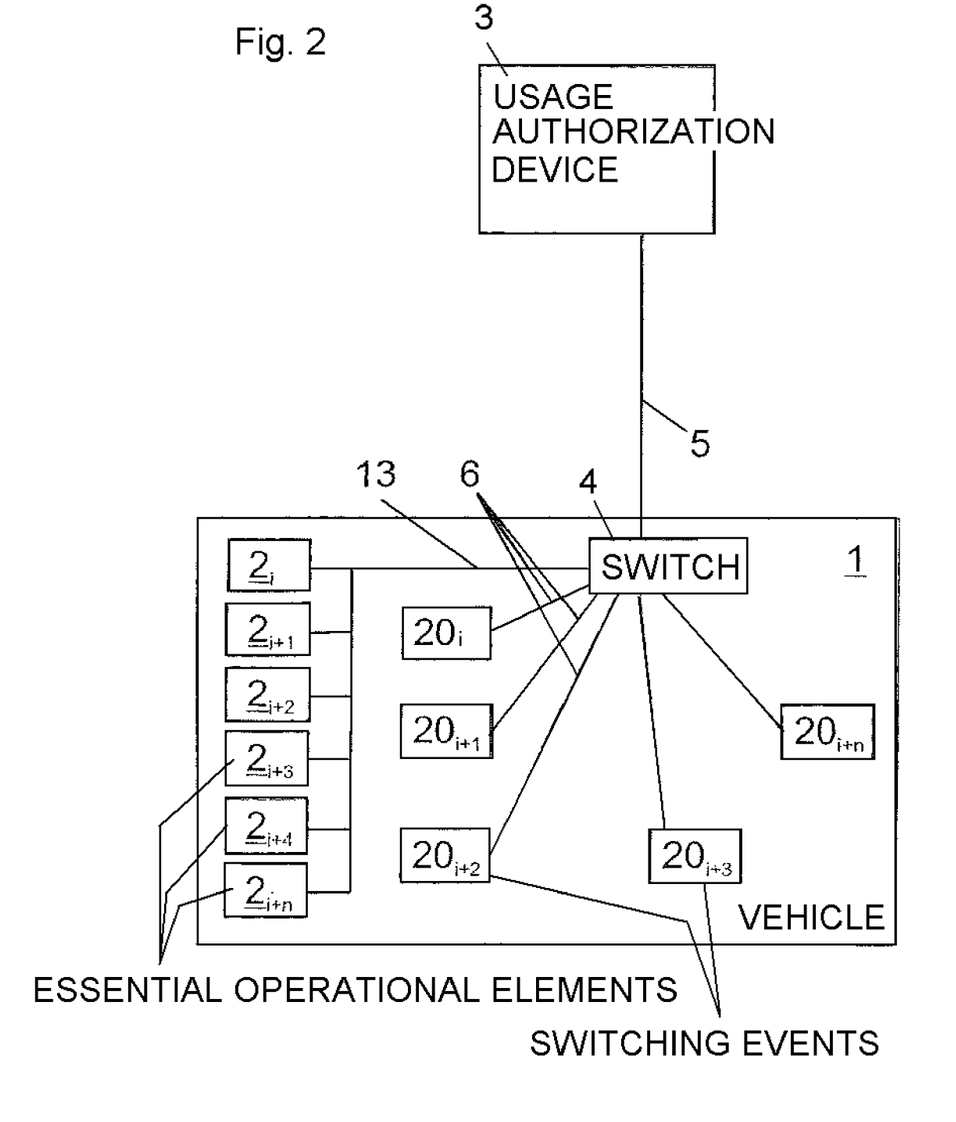
FIG. 2 a schematic illustration of an embodiment of the device according to the invention, FIGS. 3a and 3b a schematic illustration of embodiments of the usage authorization device, FIG. 4 a schematic illustration of the securement measure by means of a stop valve.

At the bottom of FIG. 2 is schematically shown a vehicle 1, which is to be protected against theft with the system and the method according to the invention. At least one essential operational element $2_i$ of vehicle 1, which is, for example, a control apparatus of the vehicle 1, is connected through at least one operational connection 13 with a switching device 4. This switching device 4 can switch the essential operational elements $2_i$, individually or together, between the operating states A, B and C. In a modification of the embodiment a separate switching device 4 is connected with each essential operational element $2_i$ or one switching device 4 each across an operational connection 13 with the particular essential operational element $2_i$. The switching device 4 can be a discrete apparatus in the vehicle 1 as well as also a circuit integrated into one essential or several essential operational elements 2 or a circuit integrated into a central processor unit of the vehicle 1.

The switching device 4 or, in an alternative implementation, several switching devices 4 are connected across operational connections 6 with means for detecting events $20_i$, which can be located at different sites of the vehicle 1.

The means for detecting switching events $20_i$ serve for the purpose of reporting specific events to the switching device 4, which, in turn, cause the switching device 4 to block an essential operational element $2_i$.

The following events can lead to the triggering of the switching of an essential operational element $2_i$ into operating state B through the switching device 4:

Maintenance interval of vehicle 1 has expired
Changing of license plate
Covering over the license plate
Manipulation on the vehicle
Return of voltage after removal of battery or disconnection of the alternator
Certain number of tank fillings
Number of kilometers driven
Certain number of actuations of opening the vehicle (trunk, car door, engine compartment hood, tank cap)
Pressing of an actuation switch in the passenger compartment Penetration into the passenger compartment with the vehicle locked Hoisting the vehicle Removal of a securement nut on the wheel Removal of wheel rim or brake disks Opening of caps for replenishing oil, coolant, transmission lubricant Opening of bleed screws for engine oil, transmission oil Disconnecting of individual control apparatus or disconnecting sensors which are utilized for detecting events Connecting diagnostic means or use of a diagnostic terminal and reading out via a data line of the vehicle (CAN, MOST, etc.)

Relatively long parking time of the vehicle

Calling out a certain word, which is recognized by means of a speech recognition system Replacement of lights for the vehicle illumination Removing the cover of the engine hood, which permits access to spark plugs, engine control apparatus and cylinder head gasket Manipulation of the starter The events can lead individually as well as also in combination to triggering the switching by the switching device 4.

The switching device 4 is furthermore connected with a usage authorization device 3 via means for transmitting authorization data. To increase the security, in the present embodiment the usage authorization device 3 is located outside of the vehicle, preferably in the residence or the garage of the vehicle holder, and serves for querying the authorization of the vehicle holder to drive the particular vehicle. The usage authorization device 3 will be described in greater detail in conjunction with the description of FIG. 3.

In order to report the authorization data received from the usage authorization device 3 to the vehicle 1 or to the switching device 4, as means of transmission of the authorization data 5 is employed for example a radio connection, an infrared connection or a normal plug connection. It is furthermore possible to store the data arriving from the usage authorization device 3 in the vehicle key of vehicle 1 and to read in these data for the single activation and after verifying the data in vehicle 1. The reading-in can take place for example via the ignition lock of the vehicle or via a stand-alone device. After the authorization data have been read in and have been verified, the authorization data are automatically deleted on the key. In order to exclude a falsification of the authorization data, before the vehicle is initially started up an individualization or personalization of the vehicle 1, the essential operational elements $2_i$ and the associated usage authorization device 3 takes place. The authorization data of the driver transmitted from the usage authorization device are changed each time again through an algorithm. Thus a thief, should he have obtained the authorization data, be that through car napping or through theft of the key containing the authorization data, can only once obtain the authorization to drive the vehicle. However, as soon as a switching event occurs, the thief can only drive the vehicle for a limited time. The activation of the vehicle, in which an essential operational element $2_i$ is in operating state C, must subsequently take place through the factory or a certification site, for example the ADAC.

A further operational function of the usage authorization device 3 in an alternative variant works in such manner that the key automatically contacts the usage authorization device 3 when the car is started, for example via an Internet connection of the vehicle or via another transmission connection—as described above. In this implementation the event triggering the switching, can be for example a manipulation of the e-mail/Internet linkage of the vehicle. A further capability comprises that the event can be the manipulation on the antenna or the failure of the antenna lasting for a certain time period or the blockage of the antenna. To circumvent this security gap, the chassis or parts of the chassis can also be utilized as the antenna.

It is understood that the system can also be combined with any other security device such as for example an immobilizer. The combination, moreover, with a GPS device is possible via which a remote immobilization of the vehicle can be ordered from the usage authorization device 3 or a switching of the operating state can take place. To increase the security further, it is possible in one implementation of the invention that the vehicle, if an essential operational element $2_i$ is in operating state B, transmits continuously or at certain time intervals the vehicle position via GPS and mobile telephone or Internet linkage to the us authorization device 3 or to a central computer at the factory or to a certification site, for example the ADAC. Furthermore, for locating the vehicle the freight vehicle toll acquisition system currently installed by the Federal Government could be utilized.

As means for transmitting the authorization data 5 from the usage authorization device 3 to the vehicle 1 or the switching device 4, an automatic operational connection when driving the vehicle into the garage or a car port or parking place can also be established via radio, contact or infrared connection or an optical connection.

Further, as an alternative embodiment, it is possible to integrate the usage authorization device 3 into the vehicle. Authorization data are only transmitted to the vehicle 1 when, for example, legitimation occurs via the different keys (9, 10) and the vehicle key.

In this way it is also possible in one embodiment to implement it such that in the event an essential operational element $2_i$ of the vehicle is in operating state C, switching back the essential operational elements $2_i$ of the vehicle into operating state A takes place by means of all four keys.

Figure 1:
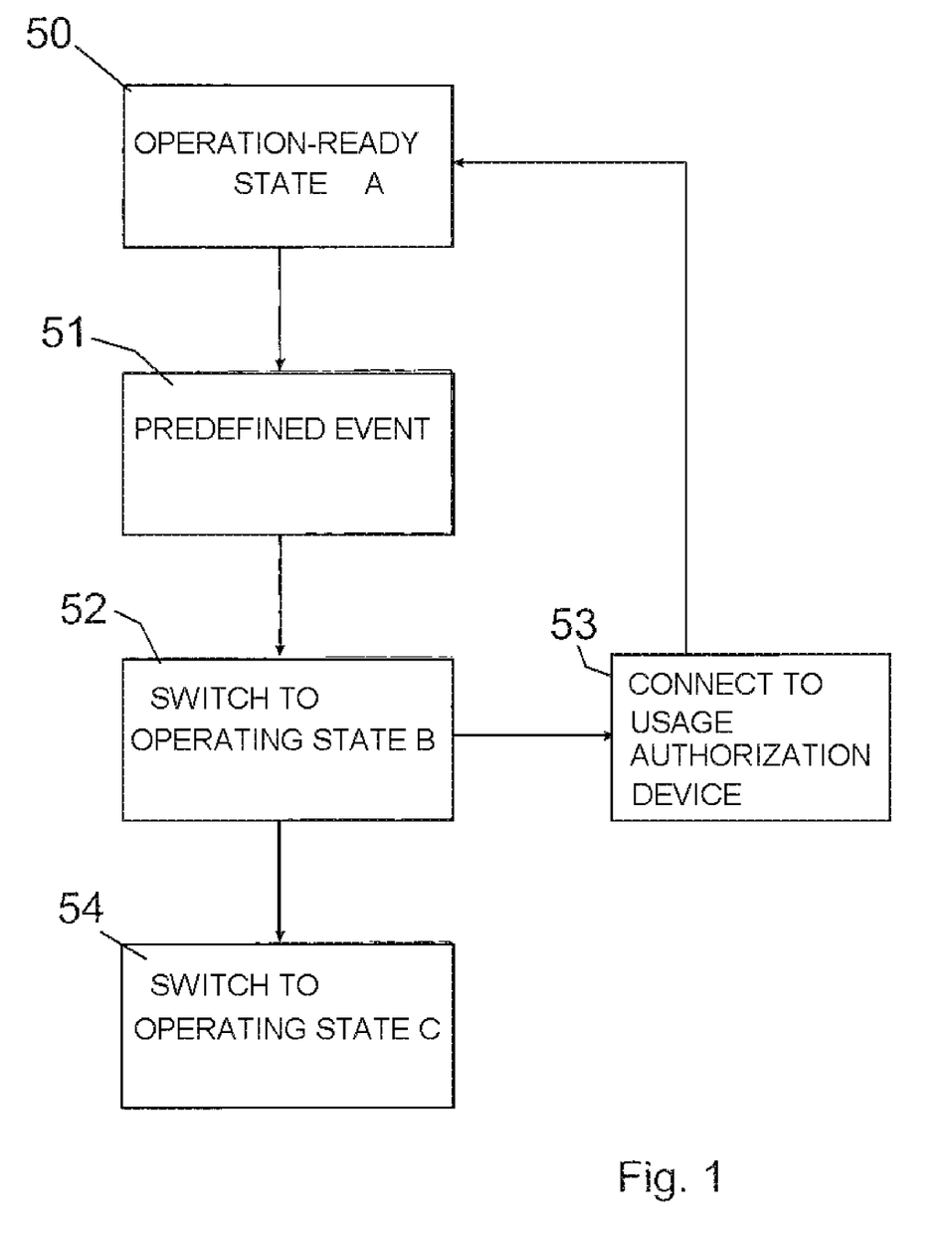
FIG. 1 a flow chart of the method according to the invention.

FIG. 1 depicts schematically a method, in which, in method step 50, the vehicle is initially in the operation-ready state, in which all essential operational elements $2_i$ are switched into a substantially unrestricted operation-ready operating state A by an external usage authorization device 3 independent of the vehicle through means for transmitting the authorization data 5. This state represents the normal state, in which the vehicle holder can operate the vehicle normally. This is the operating state in which the vehicle leaves the factory and can be individualized in a special embodiment of the invention which has been described above.

If one or several predefined events occur, which have also been described above—denoted in FIG. 1 by reference number 51—at least one essential operational element $2_i$ is switched by a switching device 4 into an operating state B (reference number 52) operation-ready for a specific length of time, the length of time depending on predefined operating parameters. As such operating parameters, in turn, can be utilized as a counter, for example the kilometers driven or the number of times the tank cap has been opened or other above listed operating parameters.

In an alternative solution according to the present invention the switching device 4 can also be integrated into one or several essential operational elements $2_i$, hereby making the access by a thief additionally more difficult.

During this length of time, in which the essential operational element $2_i$ is in operation-ready state B—in order to continue to keep the vehicle operational—a switching signal must be transmitted from the usage authorization device 3 to the switching device 4, for example by driving the vehicle into the garage and establishing connection with the usage authorization device 3 (reference number 53). The authorization data can also be transmitted over any further means for the transmission of the authorization data 5—as described above—to the switching device or the essential operational element(s) $2_i$.

If this does not take place within the length of time, the essential operational element $2_i$, which previously had been in operating state B, is switched into operating state C, which brings the vehicle to a standstill and makes it no longer operation-ready (reference number 54). In this state the vehicle can be switched into operating state A either by the factory or by a certain certification site after close examination of the authorization of the vehicle holder or via all four keys of the vehicle holder. Consequently, a method has been provided whereby the theft of a vehicle equipped with such method and such system is no longer profitable, since the vehicle can only be driven for a certain short distance or is blocked at the next attempt to start it, respectively. Since after a theft, the majority of vehicles is moved out of the country, thieves are no longer successful with vehicles equipped with such system and such method.

Figure 3A:
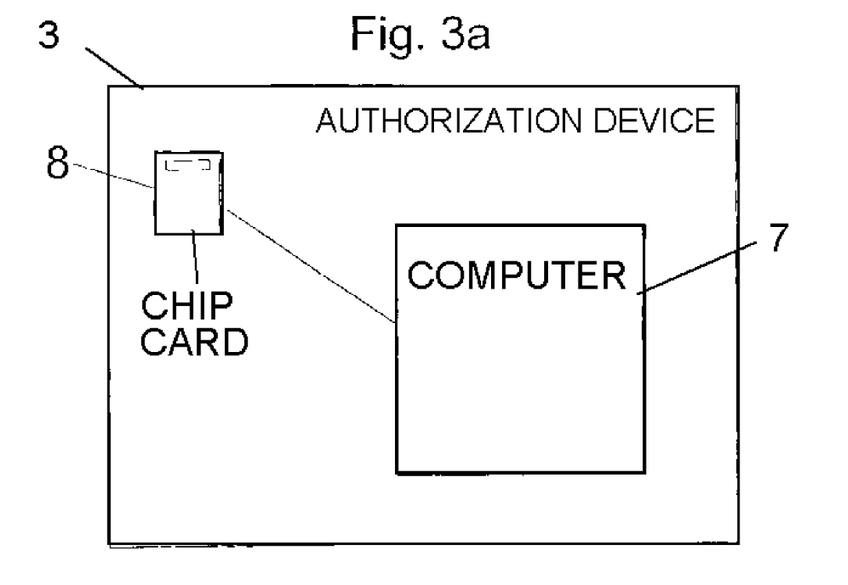

FIG. 3a shows a usage authorization device 3 in a first embodiment. It includes a computer 7 which receives via a chip card 8 the authorization for use. The particular setting of the desired parameters can be carried out on the computer 7 in a manner providing a clear overview. As soon as the setting is completed, the computer 7 transmits the parameters via means for transmitting the authorization data 5 to the switching device 4, which converts the parameters.

For example, the user authorized by the chip card 8 presets at the computer a time period of one week for the use of the vehicle 1. This parameter is subsequently transmitted, optionally via an encrypted connection through means for the transmission of the authorization data 5, to the switching device 4. After the occurrence of the switching event, which had been reported by the means for detecting a switching event $20_i$ across the operational connection 6, this switching device 4 enables the essential operational element $2_i$ (for example control apparatus) for one week.

In another embodiment computer 7 can store the parameters in, for example, a secure SQL data base. The switching device 4 in vehicle 1, in turn, fetches the parameters stored in the SQL data base and accordingly enables the essential operational element $2_i$. In this case the storage in the Internet and the calling-up by the switching device 4 represents the means for transmission of the authorization data 5. It is also conceivable that the computer 7 is any desired computer with Internet connection, which, for example, accesses the home page of the vehicle manufacturer and the user can identify himself either with a user name and a password or a chip card and can subsequently complete the settings directly online. The blocking device subsequently fetches at certain points in time, for example when the vehicle is being started, the data from the data base on the secure server.

Figure 3B:
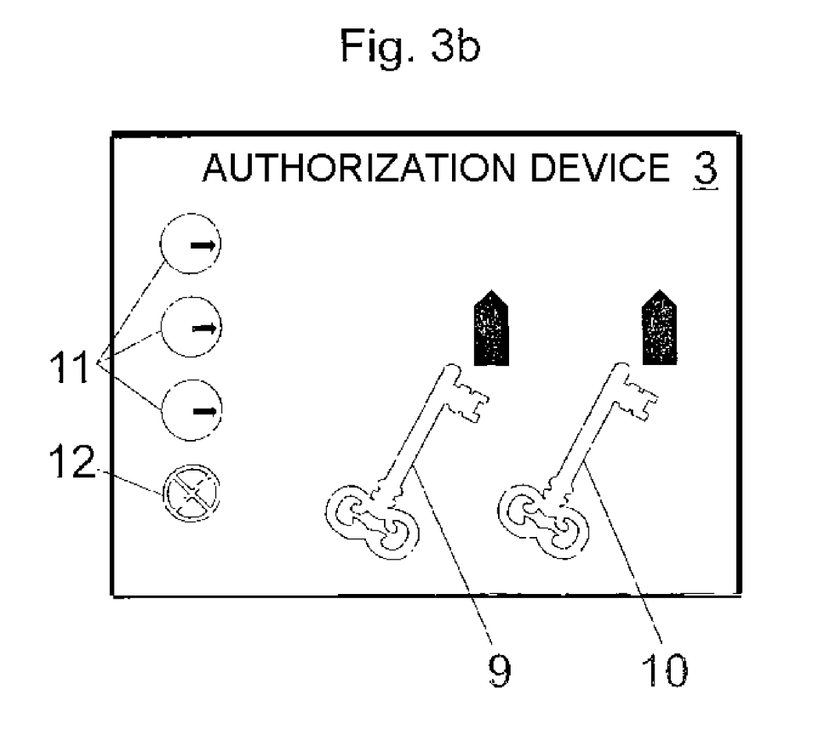

In FIG. 3b as the usage authorization device 3 a switch device is provided, which may include one lock for a replacement key 9 and a workshop key 10 each, serving as documentation of authorization. With switch 11 the authorized user can carry out the above settings of the parameters. An actuation button 12 initiates the transmission of the operating parameters through the means for transmitting the authorization data 5 to the switching device 4 in vehicle 1. The enabling of the blockage can already be activated through one of the keys. A further increase of the security results by requiring for the enabling the second or a further key which otherwise does not have any function. This further key can, in turn, be a replacement for a key known to the person of skill in the art.

Figure 4:
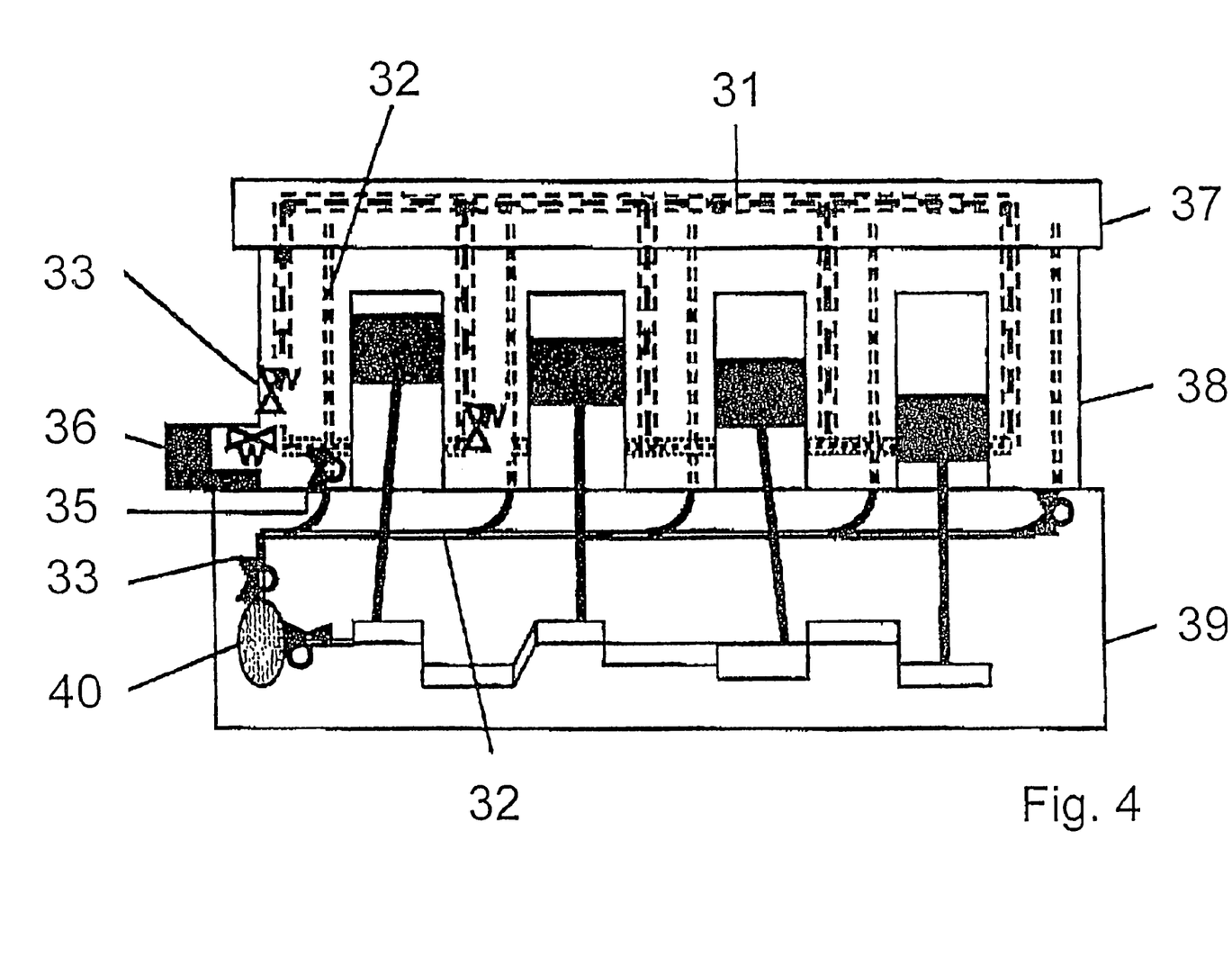

FIG. 4 depicts an engine block 38 with a cylinder head 37 and an oil pan 39. The schematically depicted engine includes furthermore a water pump 36 and an oil pump 40. The oil pump 40 provides the circulation of the oil in the oil line 32, which serves for the lubrication of the movable parts and the heat dissipation. To cool the oil flowing in the oil line, which becomes heated during the engine operation, serves the water circulating in the water line 31.

To block the water circulation in the water line 31 serves a stop valve 33. A substantially constructionally identical stop valve 33 serves for blocking the oil circulation in the oil line 32. After blocking by the stop valve 33, the engine, and consequently the vehicle, can still be utilized for some time before the engine overheats. For a measure of assurance a warning lamp can be displayed on the instrument panel, such that the driver notices the disturbance in a timely manner.

The stop valve 33 is connected through an operational connection 35 with one of the essential operational elements $2_i$, the essential operational element 2; can also be the engine itself. In this case the essential operational element $2_i$ is preferably the engine control apparatus which queries the code of the stop valve 33. From this time on the stop valve 33 accepts only commands from this engine control apparatus, which are transmitted with the correct code. If the code is correct, the stop valve can be switched in order, for example, to open the valve and to allow the circulation of the water in the water circulation.

It is understood that alternatively the gasoline line can also be blocked by a stop valve.

The system according to the invention to secure the vehicle 1 against theft can also be based on an individual coding for each vehicle. The codes of the control apparatus and of the vehicle keys are individually impressed and are neither deletable nor overwritable. Important functions are partially transferred out of the control apparatus into the key, such that the operability of the vehicle 1 is only given with the original key (circumvention security). The control apparatus function only within the operating parameters enabled by the user. To enable the operating parameters, the authorized user of the vehicle must insert, for example, all three vehicle keys into the adapters provided for this purpose. He can subsequently select as a parameter for example a time interval, within which the vehicle is operable after actuation of button 12. In addition, the vehicle can still be secured with an immobilizer also. A thief consequently must overcome the immobilizer as well as also the switching device 4, which has undeletably stored the specific parameters. Even in the case of car napping this is only possible until the preset parameters have expired. As soon as one of the parameters is fulfilled, the unauthorized user, even if he is in possession of the key and has overcome the immobilizer, can no longer use the vehicle since the switching device 4 switched the essential operational element $2_i$ into operating state B.

An even more secure embodiment of the present invention provides that several essential operational elements $2_i$ (for example all control apparatus of the diverse apparatus essential for operation) are blocked by the switching device 4 until the code, transmitted from the usage authorization device 3 over means for transmitting the authorization data 5, has been verified by all control apparatus. The transmitted code may be a code impressed into the keys and individualized by the user. Therewith it is no longer possible to set the vehicle into operation by replacing one or only a few control apparatus.

To continue making possible the employment of series control apparatus in the vehicle, the vehicle 1 when leaving the factory receives a factory code number, with the aid of which the vehicle is switched operation-ready for a short period of time. Herewith the vehicle can be driven off the assembly in the factory. When delivering the vehicle to the dealer, this factory code number is also supplied in order, for example, to be able to test drive the cars. Furthermore, a sealed code key is also delivered together with the car. With the transfer to the customer, the seal is opened and the code key removed. The customer must now insert all of the keys (key, replacement key, workshop key and code key) into the usage authorization device 3 and enter a further code (initial code) (one time) and actuate a key (for example 'Individualizing'). This sets into motion a process which writes into all keys and into all essential operational elements $2_i$ a new code number. Therewith the essential operational elements $2_i$ (for example control apparatus) are individualized. This code number can be generated from a base code, which is impressed in the keys. With each further vehicle activation with specific parameters it is subsequently only necessary to insert the particular keys.

However, in order to avoid the circumvention of the block by reading out the code number, the code number can be modified according to an algorithm with each new activation process. For the control apparatus to accept the new code number, the old code number must be queried from the keys. The keys, in turn, check whether or not the control apparatus have the old code number. Only if everything agrees do the control apparatus accept the new code number coming from the keys.

If, for example, the replacement of one (or a few) control apparatus (for example due to an accident) becomes necessary, the customer must again carry out the above process of individualizing. The new control apparatus are hereupon individualized to the code of the old control apparatus. However, this is only possible, for example, if a small number of control apparatus has been replaced. This number is defined in the security system. A thief is thereby prevented from circumventing the security measures by replacing only one or only a few control apparatus. If the simultaneous replacement of a larger number of control apparatus is necessary, the cooperation of the factory is required. In this case the number would be greater than provided in the security system. Thereby, for example, on the one hand, the simultaneous replacement of a limited number of defective control apparatus would be made possible and, on the other hand, the circumvention of the immobilizer by replacing only one or a few control apparatus is avoided.

Even if an unauthorized user has a set of keys to such vehicle and were to replace all control apparatus, the individualizing by means of the set of keys would have to be carried out. If the unauthorized user wishes to sell the vehicle, he would also need to transfer the key set to the interested party since otherwise driving would only be possible for a limited time. After that the vehicle to which the key set, in fact, belongs, would no longer be drivable with it. If he were to request a new set of keys from the factory, the factory could check for example on the key set in connection with the chassis number of the vehicle whether or not the key set and the vehicle, in fact, belong together.

If the customer does not wish to carry out the individualizing when picking up his vehicle, consequently drives away with the factory code number, he will encounter the problem that he is only able to enable short intervals each time and must continuously always enter the, for example, 10-digit factory code number. If, as the parameter, a specific usage period or a specific usage number is preset, the vehicle would at some time no longer be operable. Only after completing the individualization process is the vehicle again operation-ready. Thereby the individualizing, and therewith the activation, of the security system is sooner or later enforced. In this way the security is also increased for vehicle dealers when releasing a vehicle for a test drive, since the test driver only receives the one key for operating the vehicle.

Means for transmitting the authorization data from the usage authorization device 3 to the switching device 4 over greater distances, which were already described above, have the following operational function:

The authorized vehicle holder calls the usage authorization device and identifies himself with a PIN number. By way of further entries subsequently a new activation of an operating interval takes place. The usage authorization device now reports a multi-digit number, which is only valid for a single use, which the user enters into an input device of an adapter. The key inserted into the adapter is provided with the data and can thus effect the new activation—switching into operating state A—in the vehicle.

A further operational function is the following:

From his mobile telephone the user calls the usage authorization device, which recognizes the mobile telephone by the telephone number. The user is prompted to enter his PIN. The UAD sends an SMS to the mobile telephone, which contains the code for switching the operating state. The adapter receives this code via a communication port, for example USB, IR or Bluetooth, and can thus effect the activation as above. It is also conceivable that the above apparatus can be incorporated into one apparatus, for example a car key with integrated mobile telephone.

Further Operational Function:

The authorized vehicle holder contacts the usage authorization device via encrypted e-mail. The usage authorization device sends the switching data, also encrypted, back to the adapter. The information is here decrypted and transmitted to the switching device 4.

This can be accomplished similarly over an Internet connection, which establishes a connection with the usage authorization device. By entering a PIN and appropriate forms or dialogs, he can effect the activation and optionally, in addition, even adapt the parameters.

LIST OF REFERENCE NUMBERS

1 vehicle
$2_i$ essential operational elements
3 usage authorization device
4 switching device
5 means for transmitting the authorization data
6 operational connection
7 computer
8 chip card reader
9 replacement key
10 workshop key
11 switch
12 actuation button
13 operational connection
$20_i$ means for detecting a switching event
31, 32 fluid line
33 stop valve
34 essential drive power train
35 operational connection
36 water pump
37 cylinder head
38 engine block
39 oil pan 40 oil pump
50 operating state A
51 switching event
52 switching into operating state B
53 authorization data is transmitted from the usage authorization device to the switching device, switching into operating state A
54 essential operational element is switched into operating state C

The invention claimed is:

1. Method for securing a vehicle against theft, characterized in that at least one essential operational element of the vehicle can be switched between three operating states A, B and C and is switched between these operating states according to the following steps:
   a. the essential operational elements are switched into a substantially unrestricted operation-ready operating state A by an external usage authorization device independent of the vehicle over means for transmitting the authorization data,
   b. at least one essential operational element is switched into an operation-ready operating state B by an event-dependent circuit through at least one event for a period of time, the period of time depending on predefined operating parameters,
   c. either at least one essential operational element of the vehicle is switched after the passage of time for putting out of operation the vehicle into a non-operation-ready or restrictively operation-ready operating state C or the essential operational elements are switched before the passage of the time period into operation-ready operating state A according to method step a) by means of the usage authorization device via means for transmitting the authorization data, and
   wherein, as the means for transmitting the authorization data from the usage authorization device, a vehicle key is employed, through which the authorization data, being encrypted, are transmitted to a switching device, which, in the case of authorization, switches the essential operational element of the vehicle into operating state A and that subsequently the authorization data is deleted from the vehicle key.

2. Method as claimed in claim 1 characterized in that in the case of erroneous authorization data at least one essential operational element is switched into operating state C or that the essential operational element(s) after passage of the time period is(are) automatically switched into operating state C or the time period is restricted to a maximum thereby that a counter for the time period has a maximal number of digits.

3. System for securing a vehicle (1) against theft by means for switching (3, 4, 5) at least one essential operational element ($2_i$) of the vehicle (1), the means for switching (3, 4, 5) comprising at least one usage authorization device (3), at least one switching device (4) for switching between specific operating states of the essential operational element(s) ($2_i$) and means for transmitting the authorization data (5) between the usage authorization device (3) and the switching device (4), characterized in that the essential operational element(s) ($2_i$) is(are) switchable between three operating states A, B and C, operating state A permitting the essentially unrestricted operation of the essential operational element(s) ($2_i$), operating state B permitting the operation, restricted by operating parameter P to a time period Z, of the essential operational element(s) ($2_i$) and operating state C causing the blockage of the essential operational element(s) ($2_i$), with the switching device (4) being connected over at least one operational connection (6) with at least one means each for detecting a switching event ($20_i$), wherein at least one of the essential operational elements ($2_i$) comprises a fluid line (31, 32) in which for blocking the fluid line (31, 32) is disposed a stop valve (33), which includes a coding or is connected via an operational connection (35), with a stop valve (33) located in a fluid line (31, 32) of an essential drive power train (34), with the stop valve (33) including a coding which is verifiable by the essential operational element ($2_i$) over the operational connection (35), or the fluid line (31, 32) being a coolant circulation (31), an oil circulation (32) or a gasoline line.

4. System as claimed in claim 3 characterized in that the usage authorization device (3) is formed as an external usage authorization device (3) independent of the vehicle (1).

5. System as claimed in claim 3 characterized in that the means for detecting a switching event ($20_i$) is an actuation switch located in the vehicle.

6. System as claimed in claim 3, characterized in that the means for detecting a switching event ($20_i$) comprises a sensor for detecting an activation of an opening selected from the group consisting of a car door, engine compartment hood, tank cap, and trunk of the vehicle (1), and a locking sensor for detecting the locking state of the vehicle (1), or includes a passenger compartment monitoring sensor comprises a sensor for detecting a hoisting of the vehicle or includes a circuit for detecting a voltage return of an essential operational element ($2_i$) of the vehicle (1) or includes a sensor for detecting the connection of diagnostic means to plug connectors of the vehicle (1) provided for this purpose or includes a sensor for detecting a covering-over of a license plate of the vehicle (1) or includes a sensor for detecting a removal of a license plate of the vehicle (1) or comprises means for speech recognition or comprises means for position determination and a data base listing areas of increased theft hazard in order to trigger a switching when driving through such areas.

7. System as claimed in claim 3, characterized in that the means for detection is comprised of a plurality of said essential operational elements and only in combination of several events the switching to operating state B through the switching device (4) takes place.

8. System as claimed in claim 3, characterized in that the usage authorization device (3) comprises means for querying authorization (8, 9,10).

9. System as claimed in claim 8, characterized in that as means for the querying authorization a chip card reader (8) is provided or an apparatus for detecting biometric functions is provided or at least one key (9, 10) with associated lock is provided.

10. System as claimed in claim 3, characterized in that the essential element ($2_i$) is the control apparatus of the vehicle.

11. System as claimed in claim 3, characterized in that the means for transmitting the authorization data (5) includes a transmitter and a receiver for electromagnetic waves or comprises an Internet connection of the usage authorization device (3) and of the blocking device (4), which jointly access a data base which makes available to the blocking device (4) parameters stored there by the usage authorization device (3).

12. System as claimed in claim 3, characterized in that the system comprises means for transmitting the authorization data from the usage authorization device (3) to the switching device (4) from a relatively great distance or comprises at least one communication device, one input device and one output device, which, via an adapter, transmits the authorization data to the switching device (4), or the communication device establishes an Internet connection or an e-mail connection or a telephone connection, or a mobile telephone connection, between the adapter and the usage authorization device (3) or the adapter is formed as a USB adapter or an infrared adapter, or a Bluetooth adapter.

13. System as claimed in claim 3, characterized in that the switching device (4) is integrated into an essential operational element (2$_i$).

14. System for securing a vehicle (1) against theft by means for switching (3, 4, 5) at least one essential operational element (2$_i$) of the vehicle (1), the means for switching (3, 4, 5) comprising at least one usage authorization device (3), at least one switching device (4) for switching between specific operating states of the essential operational element(s) (2$_i$) and means for transmitting the authorization data (5) between the usage authorization device (3) and the switching device (4), characterized in that the essential operational element(s) (2$_i$) is(are) switchable between three operating states A, B and C, operating state A permitting the essentially unrestricted operation of the essential operational element(s) (2$_i$), operating state B permitting the operation, restricted by operating parameter P to a time period Z, of the essential operational element(s) (2$_i$) and operating state C causing the blockage of the essential operational element(s) (2$_i$), with the switching device (4) being connected over at least one operational connection (6) with at least one means each for detecting a switching event (20$_i$), and wherein the system includes a code key or code card such that a reading-out of a code contained in the code key or code card is only possible with a destruction of the code key or the code card, respectively.

15. System as claimed in claim 14, characterized in that the code key or code card are provided with an optic securement comparable to the securement elements known from bank notes, wherein in the code key or the code card, respectively, of the same type of vehicle different combinations of securement elements are usable.

16. System as claimed in claim 14, characterized in that the code key or the code card, respectively, includes at least two codes, a first code for communication with the usage authorization device and a second code for utilizing an enable function, or a key and original code card or code key, respectively, can only be used together for specific functions.

* * * * *